US008058839B2

(12) United States Patent
Saw

(10) Patent No.: US 8,058,839 B2
(45) Date of Patent: Nov. 15, 2011

(54) PORTABLE ELECTRIC CHARGING ADAPTOR FOR ELECTRONIC DEVICES

(76) Inventor: Hock Thiam Saw, Kowloon (HK)

( * ) Notice: Subject to any disclaimer, the term of this patent is extended or adjusted under 35 U.S.C. 154(b) by 0 days.

(21) Appl. No.: 12/964,243

(22) Filed: Dec. 9, 2010

(65) Prior Publication Data

US 2011/0084661 A1 Apr. 14, 2011

Related U.S. Application Data

(63) Continuation of application No. PCT/GB2010/051408, filed on Aug. 25, 2010.

(51) Int. Cl.
*H01M 10/46* (2006.01)

(52) U.S. Cl. .................................................... 320/111

(58) Field of Classification Search .................. 320/107, 320/111, 114, 115; 439/172, 176, 177, 660
See application file for complete search history.

(56) References Cited

U.S. PATENT DOCUMENTS

| | | | | |
|---|---|---|---|---|
| 7,121,850 | B2 | 10/2006 | Yeh | |
| 7,347,736 | B2 | 3/2008 | Ni | |
| 2003/0148663 | A1 | 8/2003 | Hsin | |
| 2006/0099840 | A1* | 5/2006 | Yeh | 439/172 |
| 2007/0134990 | A1 | 6/2007 | Su et al. | |
| 2007/0178769 | A1* | 8/2007 | Ni | 439/660 |
| 2008/0284371 | A1 | 11/2008 | Hsu | |
| 2009/0051319 | A1 | 2/2009 | Fang et al. | |

FOREIGN PATENT DOCUMENTS

| | | | |
|---|---|---|---|
| CN | 201114717Y | Y | 9/2008 |
| CN | 201204239Y | Y | 3/2009 |
| JP | 2001-319745 | A | 11/2001 |

OTHER PUBLICATIONS

CN 201114717Y, English Abstract Translation, 1 page.
JP2001-319745, English Abstract Translation, 2 pages.
CN 201204239Y, English Abstract Translation, 1 page.

* cited by examiner

*Primary Examiner* — Edward Tso
(74) *Attorney, Agent, or Firm* — McKee, Voorhees & Sease, P.L.C.

(57) ABSTRACT

A portable electric device charging connector arrangement comprising a socket, a power supply connected to the socket, the socket including a female USB connector; an adapter comprising a housing and a male USB plug extending from the housing; a mounting arranged to support the housing; the mounting including a socket engaging portion arranged so that the socket engaging portion engages the socket when the USB plug is engaged in the USB socket; the housing further comprising a device connector extending upwardly in use so that a portable electric device may be charged when engaged to the device connector.

17 Claims, 7 Drawing Sheets

PORTABLE ELECTRIC CHARGING ADAPTOR FOR ELECTRONIC DEVICES

CROSS REFERENCE TO RELATED APPLICATIONS

This application is a continuation of PCT application GB2010/051408, filed on Aug. 25, 2010, which claims priority to United Kingdom Application No. 0915435.2 filed on Sep. 4, 2009. The disclosures of these applications are hereby incorporated by reference in their entirety.

BACKGROUND OF THE INVENTION

This invention relates to a connector arrangement for connection of a portable electric device to a low voltage power supply, particularly to an arrangement comprising a socket connected to a low voltage power supply into which a portable device may be connected.

The problem with portable devices such as cellular phones, MP3 players and IPods® players is that each manufacturer's product has a different socket so that a charger unit and power lead must be provided for each device. This can be especially inconvenient when travelling since a mains power adapter may be necessary for each device.

SUMMARY OF THE INVENTION

According to the present invention there is provided a portable electric device charging connector arrangement comprising a socket, a power supply connected to the socket, the socket including a female USB connector; an adapter comprising a housing and a male USB plug extending from the housing; a mounting arranged to support the housing; the mounting including a socket engaging portion arranged so that the socket engaging portion engages the socket when the USB plug is engaged in the USB socket; the housing further comprising a device connector extending upwardly in use so that a portable electric device may be charged when engaged to the device connector.

Preferably the portable device may be engaged in an upright orientation to the connector.

Preferably the USB connector is arranged horizontally so that the adapter may be inserted horizontally into the socket.

The socket may be located in a vertical surface, for example a wall, wall mounting, or an article of furniture such as a bedside cabinet, seat or desk. The socket may be located in an electrically powered device, such as a computer or entertainment system. The device connector is preferably inclined towards the socket, for example at an angle from 5 to 30 degrees so that the device is inclined towards the socket for convenient display and to minimise the risk of accidental dislodgement from the connector.

The arrangement includes a mounting arranged to support the housing. The mounting includes a socket engaging portion and a formation adapted to receive and engage the housing, supporting the housing when connected to the USB socket.

In a first embodiment the mounting may comprise one or more preferably a pair of side members or runners arranged to cooperate with the base and sides of the housing to correctly align the housing as the USB plug is engaged into the socket. This embodiment finds particular use when the socket is a wall socket or a casing of a desktop computer, portable computer, entertainment system or other device having a low voltage power supply. The side members may comprise a pocket adapted to receive the housing. The runners may be arranged to support the housing as the USB jack is moved into engagement within the socket.

The socket engaging portion may include one or more, preferably three adhesive pads adapted to adhere to the surface of the socket. The adhesive may be a peelable adhesive to provide support for the housing without forming a permanent bond. The formation of a permanent bond may cause damage of the socket after removal of the device. Alternatively a permanent adhesive may be used where appropriate. Alternatively or in addition, screws or clips may be employed.

In a second embodiment the mounting may comprise a pair of runners or side members arranged to be extended in a deployed position for use but to be retracted into a stowed position when not in use. Such an arrangement may comprise a drawer arranged to receive the housing and to be moveable between open and closed positions.

In a third embodiment the mounting may comprise a cover pivotally connected to the socket and moveable between a closed position in which the female USB connector is covered by the cover and an open position in which the cover is opened to expose the connector and arranged so that in the opened position the cover supports the adapter when the adapter is connected to the socket.

The cover is preferably arranged to pivot downwardly about a generally horizontal axis. In this arrangement the inner surface of the cover may be configured to provide a support for the adapter.

In a particularly preferred embodiment the cover is attached to the housing by one or more, preferably two hooks extending through one or more respective apertures in the socket and abutting a rearwardly facing surface of the socket in the opened position. Such an arrangement has the advantage that the socket is covered when not in use, presenting a tidy appearance and avoiding a risk of occlusion of the socket by debris or dirt.

Use of hooks allows the arrangement to be assembled by a snap fit, avoiding the need for a hinge and facilitating assembly and where necessary facilitating removal of the cover for replacement.

The second or third embodiments may find particular use in public seating, for example mounted in the back of a front seat so that a user sitting in a rear seat behind the front seat may charge and use a portable device while seated. Such an arrangement may be used in cars, trains, aircraft, ships or other transportation. The arrangement may also be used in cinemas, theatres, auditoria or other locations wherein seating is provided in consecutive rows.

The portable device may be connected to a public communication system or a computer network through the USB socket.

The connector arrangement of the present invention confers several advantages. An individual adapter may be provided for a particular device, the adapter being arranged to be engageable to a universal socket, avoiding the need for a separate power supply and docking station. The adapter may include a relatively small housing with the USB and device connectors, so that the adapter is easy to transport without any need to carry a separate mains adapter or transformer unit.

The invention may further provide a portable electric device charging arrangement kit comprising a socket, a power supply connected to the socket, the socket including a female USB connector; a plurality of adapters each comprising a housing and a male USB plug extending from the housing; a mounting arranged to support a housing of an adapter; the mounting including a socket engaging portion arranged so that the socket engaging portion engages the socket when the USB plug is engaged in the USB socket; the housing of each adapter comprising a device connector selected from a group of different device connectors, each connector of the group being adapted to connect to a specific portable device; so that the portable device may be charged when engaged to the device connector.

BRIEF DESCRIPTION OF THE DRAWINGS

The invention is further described by means of example but not in any limitative sense with reference to the accompanying drawings of which.

DETAILED DESCRIPTION OF PREFERRED EMBODIMENT

Figure 1:
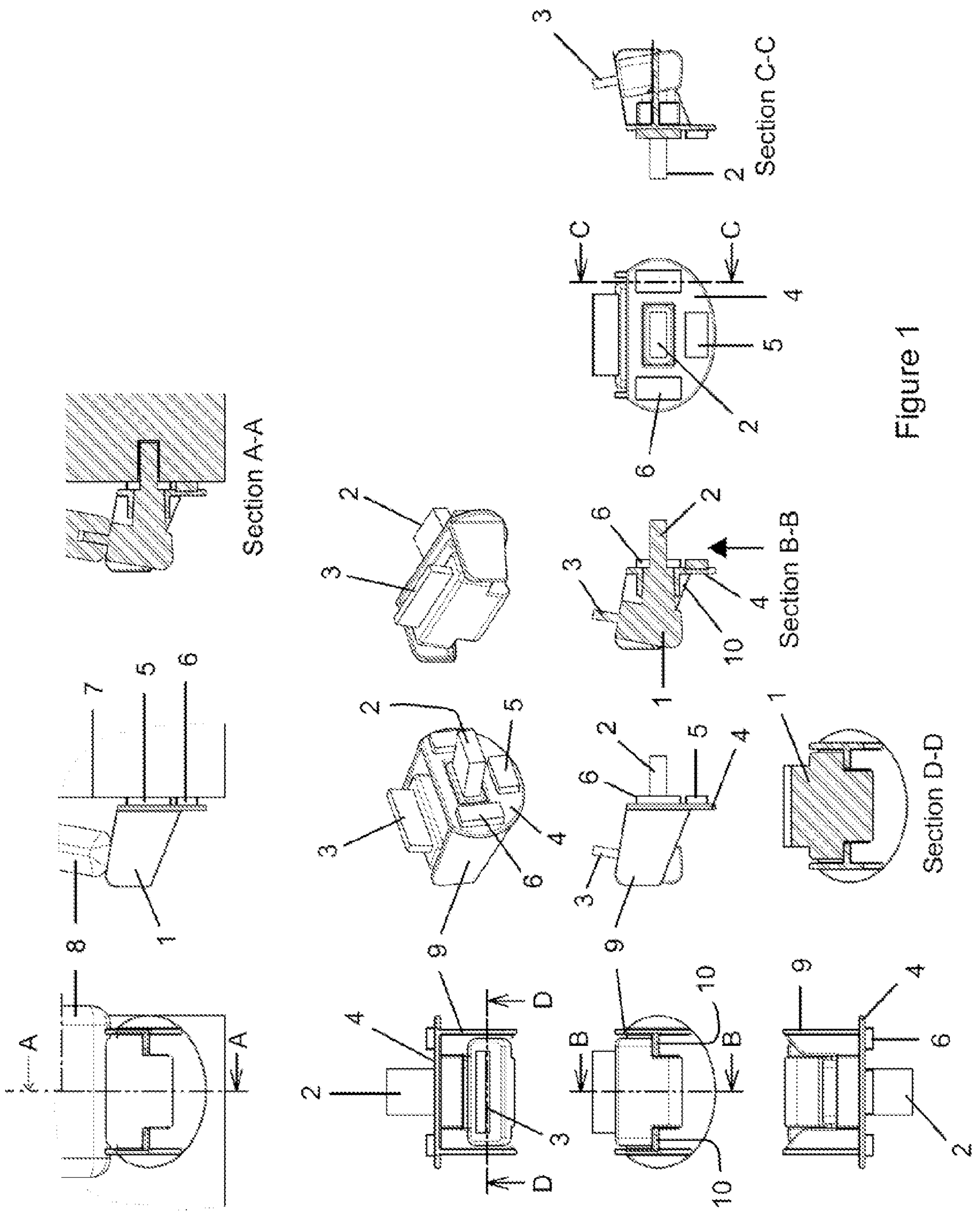
FIG. 1 shows various views of a housing and mounting in accordance with a first embodiment of the invention.

FIG. 1 shows various views of a housing and mounting in accordance with the first embodiment of the invention which is adapted to connect to a wall mounted or otherwise vertically mounted socket (7). The housing (1) comprises a unitary moulding having a male USB jack (2) extending horizontally from a socket engaging portion (4). A device connector (3) having a particular configuration selected to connect to a desired device, for example a cellular phone, IPod®, MP3 player or the like (8) extends upwardly from the body of the housing (1). The device connector (3) is inclined at an angle from 5 degrees to 30 degrees towards the socket engaging portion (4) so that the device (8) is inclined towards the socket (7) when mounted upwardly on the device connector (3). In this arrangement the device (8) may be conveniently viewed and operated without exerting excessive pressure on the USB connector. The housing (1) is mounted between side members in the form of runners (9) extending away from the socket engaging portion (4). The runners (9) may include lower portions upon which the weight of the housing and device are supported. These weight supporting portions (10) comprise flanges extending inwardly of the side as of the runners (9).

The socket engaging portion (4) may include adhesive pads (5, 6) on the side and at the bottom adapted to adhere to the surface of the socket and provide support for the runners (9).

Figure 2:
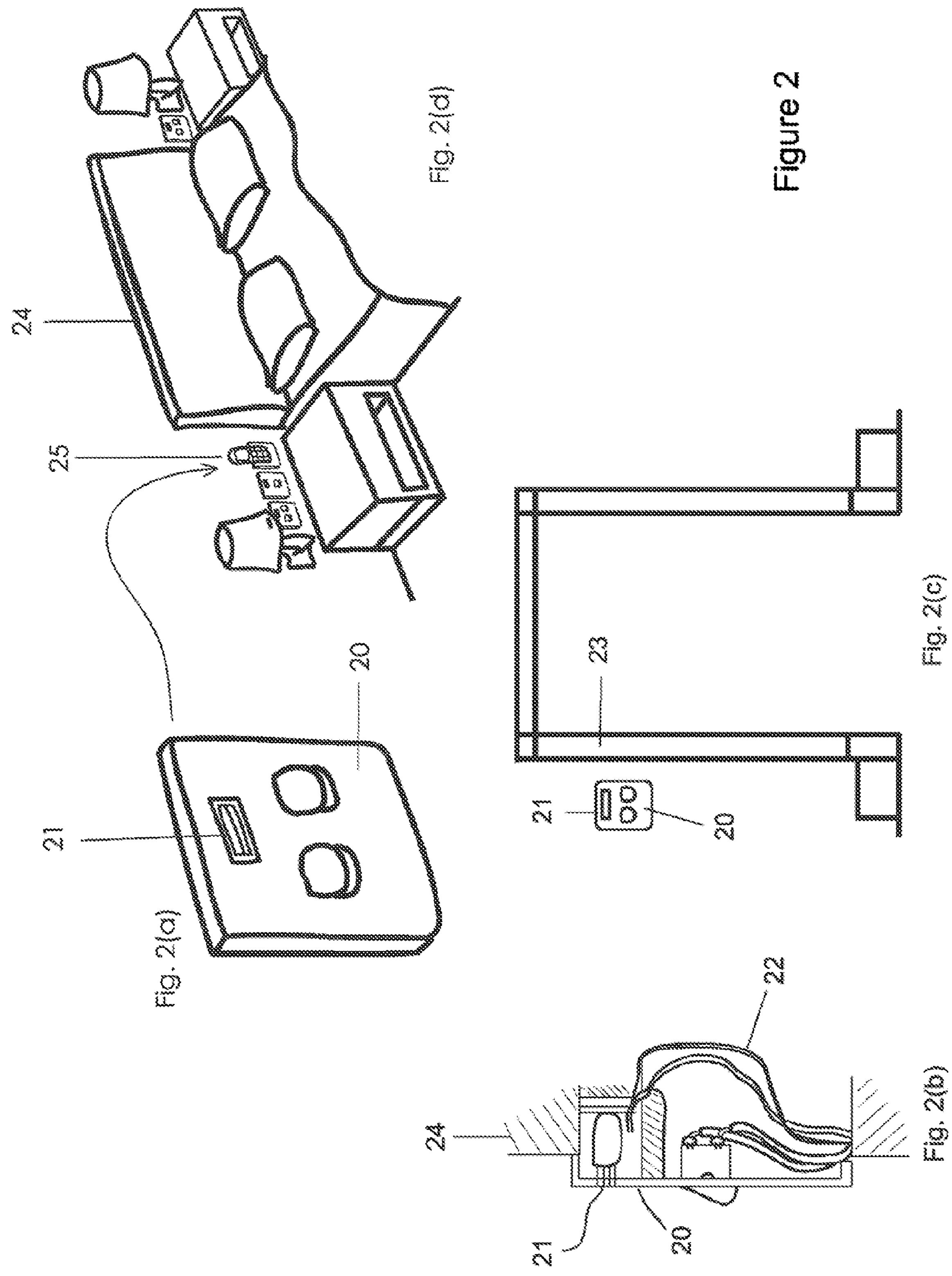
FIG. 2 comprises various views illustrating a wall mounted socket.

FIG. 2 shows various configurations for the socket. The socket may comprise a generally vertically extending face plate (20) having a horizontally extending female USB port (21) as shown in FIG. 2*a*. The face plate may comprise a light switch or other electrical installation. As shown in FIG. 2*b* the port (21) may be connected to a power supply (not shown) by means of a wiring circuit (22) to provide a suitable low voltage power supply for charging an electrical device. In FIG. 2*c* the face plate (20) is shown mounted adjacent a door frame (23) in a wall (24) in conventional manner.

Alternatively the socket may be mounted on a wall, wall plate or headboard adjacent the head of a bed (24) to provide convenient access to a cell phone (25) or other device.

Figure 3:
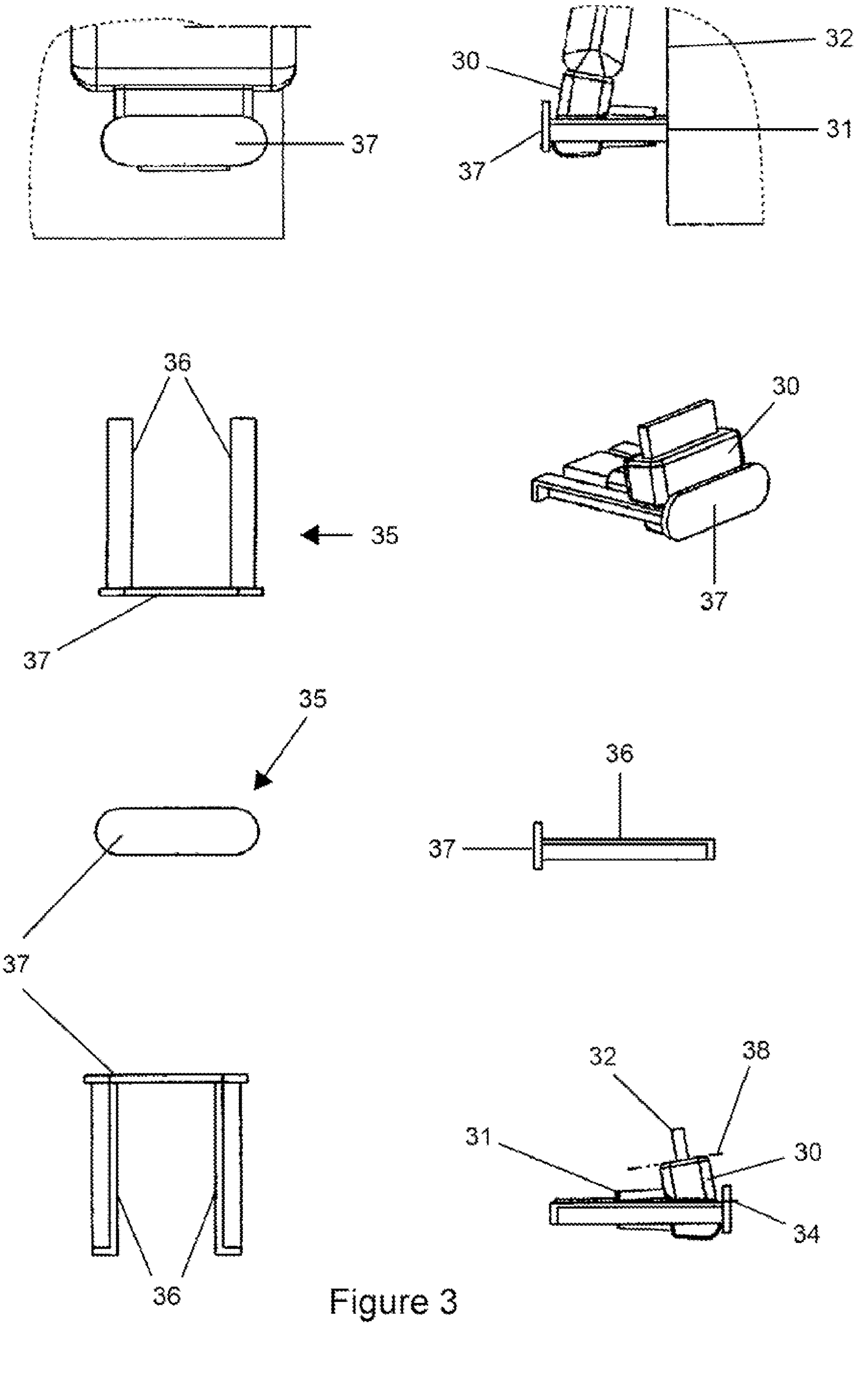
FIG. 3 illustrates a housing and mounting in accordance with an alternative embodiment of the invention.

FIG. 3 illustrates a second embodiment of the invention. The housing (30) and molding (31) for the male USB jack are generally similar to that shown in FIG. 1. The mounting comprises side members (35) having a pair of runners (36) separated by a face plate (37). The device connector (32) is located in a supporting plane (38) inclined at an angle of 5 to 30 degrees to the plane (34) to the runners and USB jack.

Figure 4:
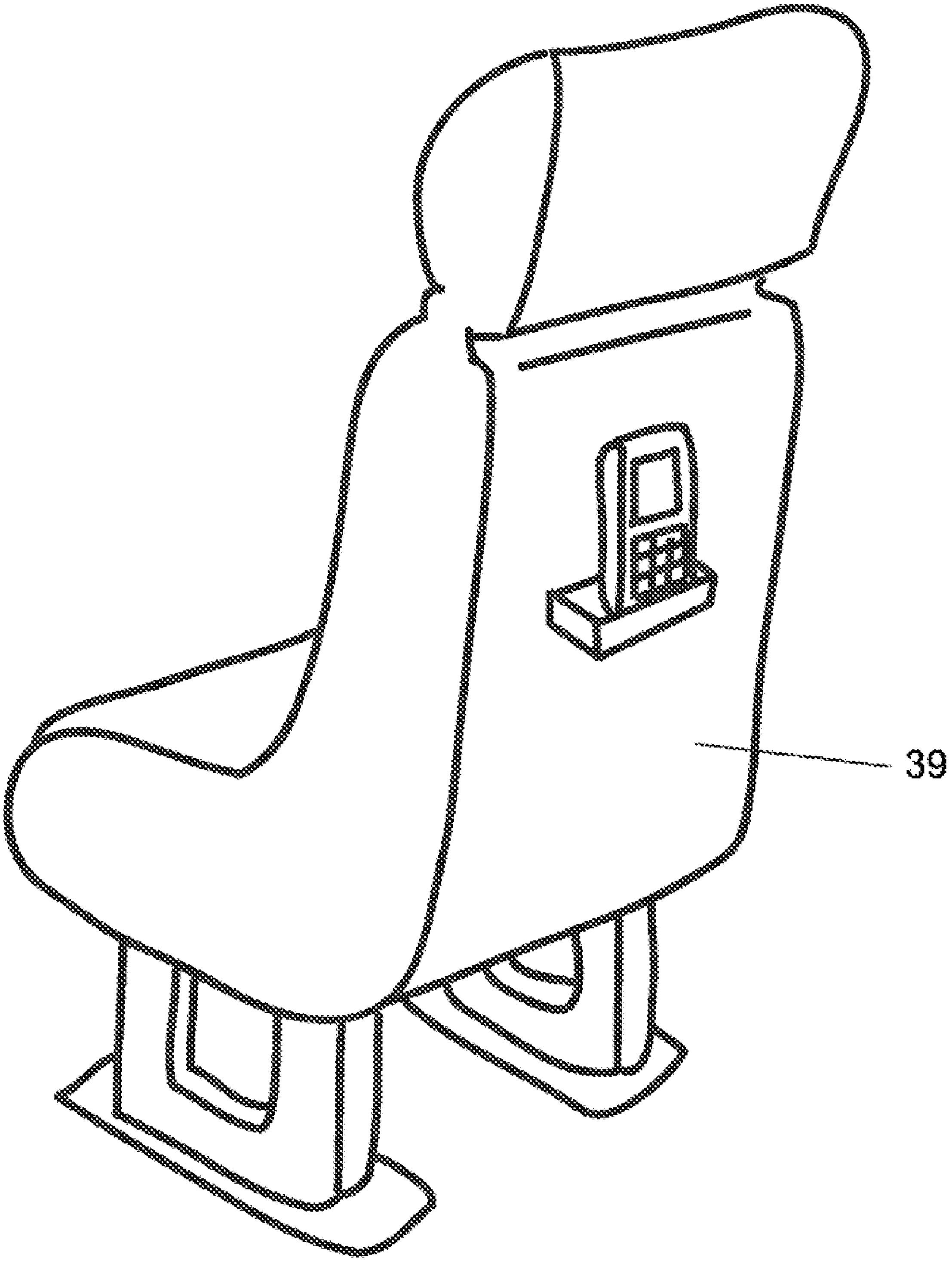
FIG. 4 comprises various views illustrating a second embodiment of the socket arrangement.

FIG. 4 shows use of the embodiment in FIG. 3 attached to the rear of a seat (39) to form a drawer-like arrangement. In this way a portable device may be connected to and charged from a socket mounted in the rear of a seat in front of the occupant, the drawer being opened to insert the housing into the mounting, the drawer being closed to engage the housing into the USB socket.

The runners (36) in FIG. 3 slide from a recess in the socket (not shown) to a deployed position when the drawer is opened. When the connector arrangement is not in use, the drawer may be closed into a stowed position so that the face plate (37) is flush with the back of the seat. In this position the runners (36) retract into the recess in the socket.

Figure 5:
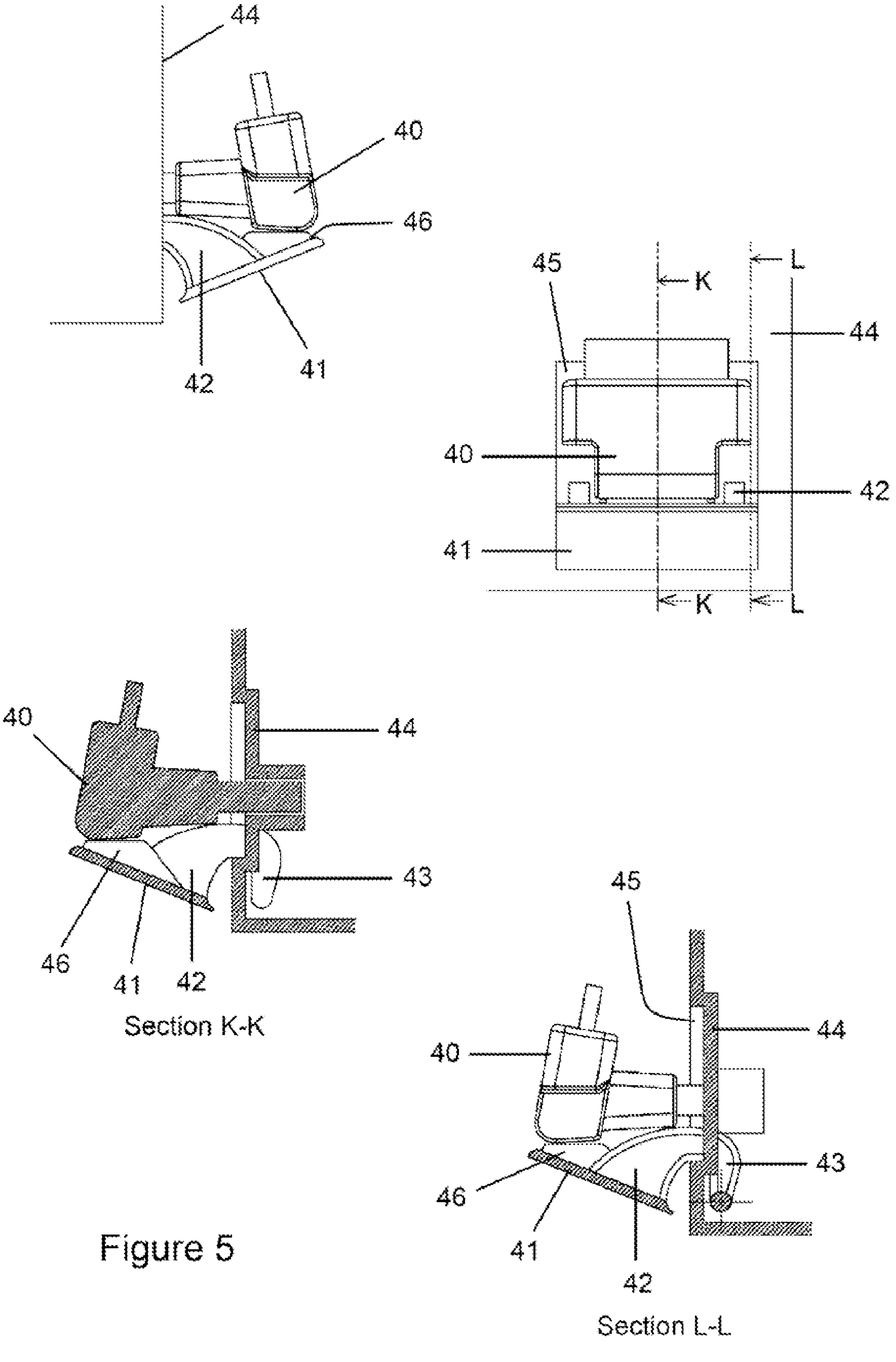
FIGS. 5 and 6 comprise various views illustrating a third embodiment of the socket arrangement.

FIG. 5 shows end and side elevations and cross sectional views of a further embodiment of the invention. The housing (40) is generally similar and may be identical to that shown in FIGS. 1 to 4. The mounting comprises a cover (41) dimensioned to be received in a recess (45) in the socket to cover the USB socket and provide a flush exterior. The cover (41) is mounted on two hooks (42) which extend rearwardly through one or more apertures in the casing (44) of the socket. The hooks terminate in downwardly extending projections (43) configured to support the cover in an opened position. The inner surface of the cover (41) comprises a cushion member (46) arranged to provide a horizontal supporting surface for the housing (40) when the cover is in the opened position.

Figure 6:
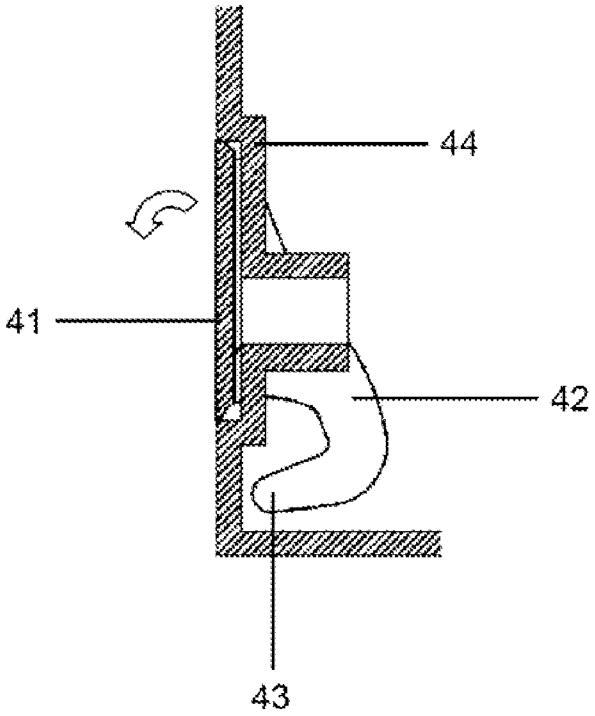
Figure 6:
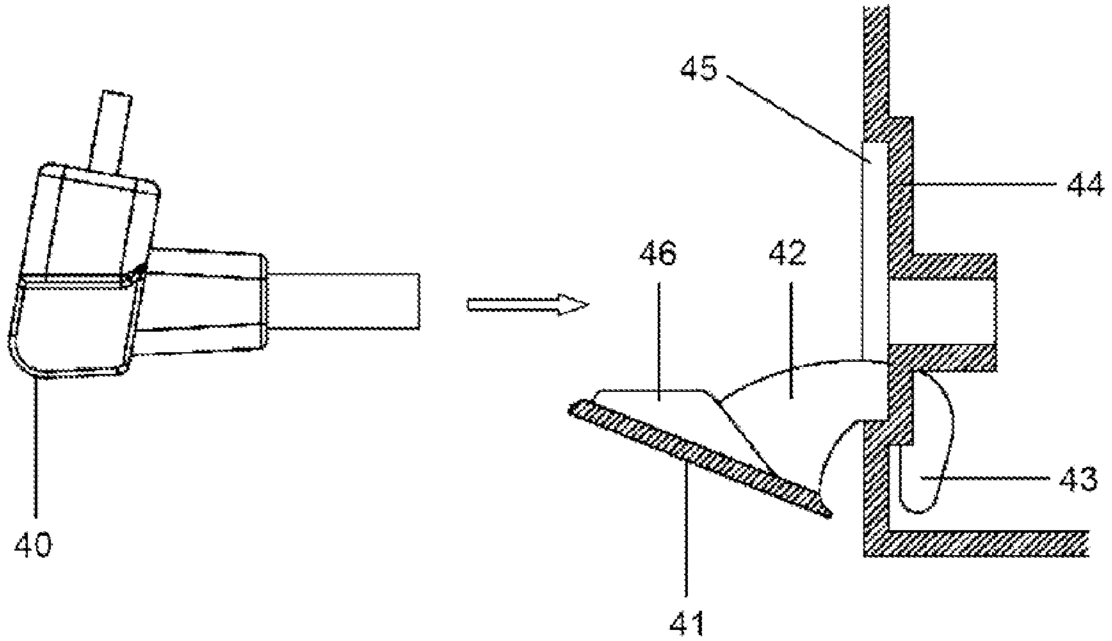

As shown in FIG. 6, in use the cover may be opened by a movement from the closed to the open position and the adapter may then be placed on the cushion member to facilitate insertion of the USB jack into the correct orientation in the USB socket. The adapter is supported in use by engagement of the hooks with the inner surface of the socket casing providing a secure mounting for the portable electrical device.

Figure 7:
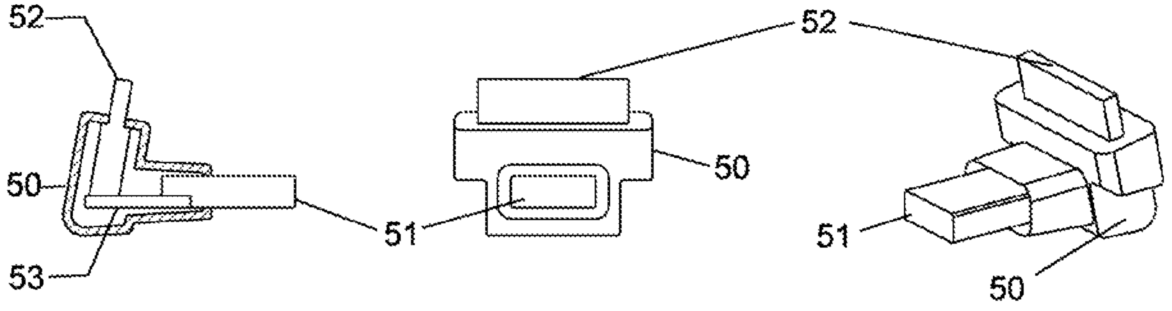
FIG. 7 comprises a cross section, elevation and perspective view of an alternative adapter.

FIG. 7 shows an alternative adapter having a housing (50) with a power supply and/or data connector (51), for example a USB connector, extending horizontally for connection to a corresponding USB port in the wall socket. A device connector (52), for example a USB connector or unique connector adapted for use with a particular portable device, extends upwardly from the housing (50). The device connector is angled towards the power supply connector (51) so that a device connected to the device connector (52) is inclined towards the wall or other vertical surface from which the USB port is mounted. A printed circuit board (53) carries a power supply circuit. A voltage divider with a programmable circuit may be provided to detect the manufacturer and model of a portable phone or other device connected to the device connector (52) and may be further arranged to set the voltage and/or current appropriately to suit the requirements of the device. A filter to remove ripples from a voltage supply may also be provided. The printed circuit board may extend parallel to the power supply connector (51), obliquely to the device connector (52). In an alternative arrangement, the printed circuit board may extend parallel to the device connector (52), obliquely to the power supply connector (51).

The invention claimed is:

1. A portable electric device charging connector arrangement comprising a socket, a power supply connected to the socket, the socket including a female USB connector; an adapter comprising a housing and a male USB plug extending from the housing;

a mounting arranged to support the housing;

the mounting including a socket engaging portion arranged so that the socket engaging portion engages the socket when the USB plug is engaged in the USB socket;

the housing further comprising a device connector extending upwardly in use so that a portable electric device may be charged when engaged to the device connector.

2. An arrangement as claimed in claim 1 wherein the mounting includes a socket engaging portion and a formation adapted to receive and engage the housing, and to support the housing when the housing is connected to the USB socket.

3. An arrangement as claimed in claim 2 wherein the mounting comprises one or more side members or runners arranged to cooperate with the base and sides of the housing to correctly align the housing as the USB plug and socket are engaged.

4. An arrangement as claimed in claim 1 comprising a pair of runners arranged to slide from a recess in the socket to a deployed position and to be retracted into the recess into a stowed position.

5. An arrangement as claimed in claim 1 comprising a cover pivotally connected to the socket and moveable between the closed position in which the female USB connector is covered and an opened position in which the female USB connector is exposed and further arranged so that the cover may support an adapter connected to the female USB connector.

6. An arrangement as claimed in claim 5 wherein the cover is arranged to pivot downwardly about a horizontal axis.

7. An arrangement as claimed in claim 5 wherein the cover is attached to the housing by one or more hooks extending through one or more apertures in the socket and abutting a rearwardly facing surface of the socket in the opened position.

8. An arrangement as claimed in claim 6 wherein the cover is attached to the housing by one or more hooks extending through one or more apertures in the socket and abutting a rearwardly facing surface of the socket in the opened position.

9. An arrangement as claimed in claim 4 wherein the socket is mounted in the back of a seat.

10. An arrangement as claimed in claim 5 wherein the socket is mounted in the back of a seat.

11. An arrangement as claimed in claim 1 wherein the device connector is inclined towards the socket at an angle from 5 degrees to 30 degrees.

12. An arrangement as claimed in claim 1 wherein the socket is a wall mounted socket.

13. An arrangement as claimed in claim 1 wherein the socket engaging portion includes one or more adhesive pads arranged to adhere to the surface of the socket.

14. An arrangement as claimed in claim 1, wherein the device connector is arranged so that the device may be connected in an upright orientation.

15. An arrangement substantially as claimed in claim 1, including a printed circuit board within the housing extending between the power supply connector and the device connector.

16. A portable electric device charging arrangement kit comprising a socket, a power supply connected to the socket, the socket including a female USB connector;

a plurality of adapters each comprising a housing and a male USB plug extending from the housing;

a mounting arranged to support a housing;

the mounting including a socket engaging portion arranged so that the socket engaging portion engages the socket when the USB plug is engaged in the USB socket;

the housing of each adapter comprising a device connector selected from a group of different device connectors, each connector of the group being adapted to connect to a specific portable device;

wherein in use the portable device is charged when engaged to the device connector.

17. A kit including a connector arrangement as claimed in claim 1.

* * * * *